(No Model.)
J. G. WIEGAND.
COVER FOR HAY OR GRAIN RICKS.
No. 470,527. Patented Mar. 8, 1892.
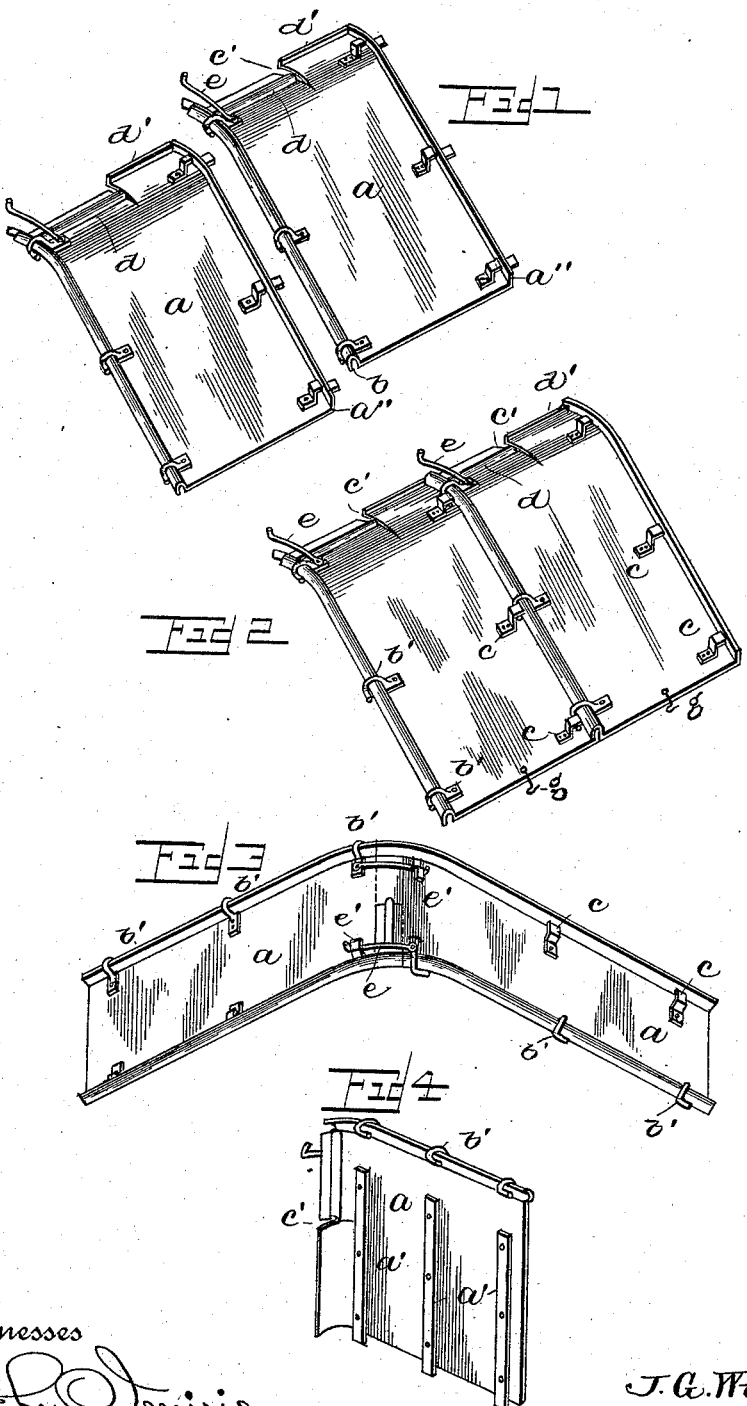

UNITED STATES PATENT OFFICE.

JOHN G. WIEGAND, OF STOCKTON, ILLINOIS.

COVER FOR HAY OR GRAIN RICKS.

SPECIFICATION forming part of Letters Patent No. 470,527, dated March 8, 1892.

Application filed August 12, 1891. Serial No. 402,486. (No model.)

*To all whom it may concern:*

Be it known that I, JOHN G. WIEGAND, of Stockton, in the county of Jo Daviess and State of Illinois, have invented a new and useful Improvement in Covers for Hay or Grain Ricks, which improvement is fully set forth in the following specification and accompanying drawings, in which—

Figure 1 is a perspective view of two detached sections of my improved cover for hay and grain ricks; Fig. 2, a view of the same, showing the manner of uniting the edges of the sections; Fig. 3, a view of two sections, showing their top connections; and Fig. 4 a view of the under side of a section.

My invention relates to improvements in devices for protecting grain and hay ricks or stacks; and its object is to provide a simple, durable, and substantial device designed to prevent the damage and loss which so frequently ensue when hay and similar farm products are imperfectly protected against wind and rain storms. It is admitted that thatching and other means heretofore employed for the purpose are inherently defective, notwithstanding the time, care, and labor required for their application. Heavy rains are almost invariably preceded or accompanied by high winds, and when a thatch is blown off no time or opportunity is afforded to repair the mischief. Vast quantities of valuable crops are thus destroyed every year.

My invention consists of a covering composed of sections of suitable sheet metal. One end of each section is bent so that when two of them are coupled they conform with the top of the rick. The contiguous ends and sides are provided with means whereby they may be quickly and securely united, and form a practically-continuous roof or covering impervious to rain and capable of resisting wind-storms of any force less than would be required to overturn the body of the rick.

Referring to the accompanying drawings, $a$ designates the sheet-metal sections. If made of iron or steel, they should be galvanized or otherwise protected from corrosion. If desired, they may be reinforced by transverse bars $a'$. The sections are provided, respectively, on one side with an upwardly-turned flange $a''$ and on the other an arched overlapping margin $b$. The edges, when attached, are firmly secured one to the other by hooks $b'$ and eyes $c$. The upper ends of the sections are divided by a central slot $c'$. One of the divisions thus formed is provided with a struck-up ridge or rib $d$. The other is folded upon itself and forms an upwardly-turned lip $d'$. These ends alternate with the engaging ends of the opposite sections, and thus compose an interlocking joint, (see Fig. 3,) which is made secure by latches $e$ and hasps $e'$. It will be observed that the sides and ends of the sections are thus mutually conjoined and cannot become disengaged by accident. In order to prevent displacement of the covers by wind-storms, they are provided at suitable intervals with hooks $g$ for wires, which extend therefrom to stakes which are driven into the ground.

The various advantages of the device will be obvious. The sections may be applied in serial order during the construction of the rick, so that the parts may be successively protected as soon as prepared for covering. Any desired number of sections may be taken off and a portion of the hay removed without uncovering the remaining part of the rick and exposing it to damage. When not in use, the sections may be conveniently piled in compact form and safely stored for future requirement.

What I claim as new is—

1. A covering for hay and grain ricks, composed of sheet-metal sections, each centrally slotted at its upper bent end and having on the respective sides of said slot a rib and a lip, thereby forming means for interlocking the edges of the opposite sections, and hooks and eyes on the respective sections for securing them in position, substantially as described.

2. A covering for hay and grain ricks, composed of sheet-metal sections, the upper bent ends of each of the opposite sections being slotted and having ribs and lips, as described, and interlocked and secured together, as set forth, and having at the adjacent edges of the several sections, respectively, a flange and an overlapping margin matched and fitted the one into the other and secured together by catches and hasps.

In testimony that I claim the foregoing I have hereunto set my hand, this 23d day of July, 1891, in the presence of witnesses.

JOHN G. WIEGAND.

Witnesses:
P. M. RINDESBACHER,
EMMA HOPKINS.